April 14, 1953 G. W. WOOLWINE 2,634,667
LAWN EDGER
Filed Nov. 18, 1947
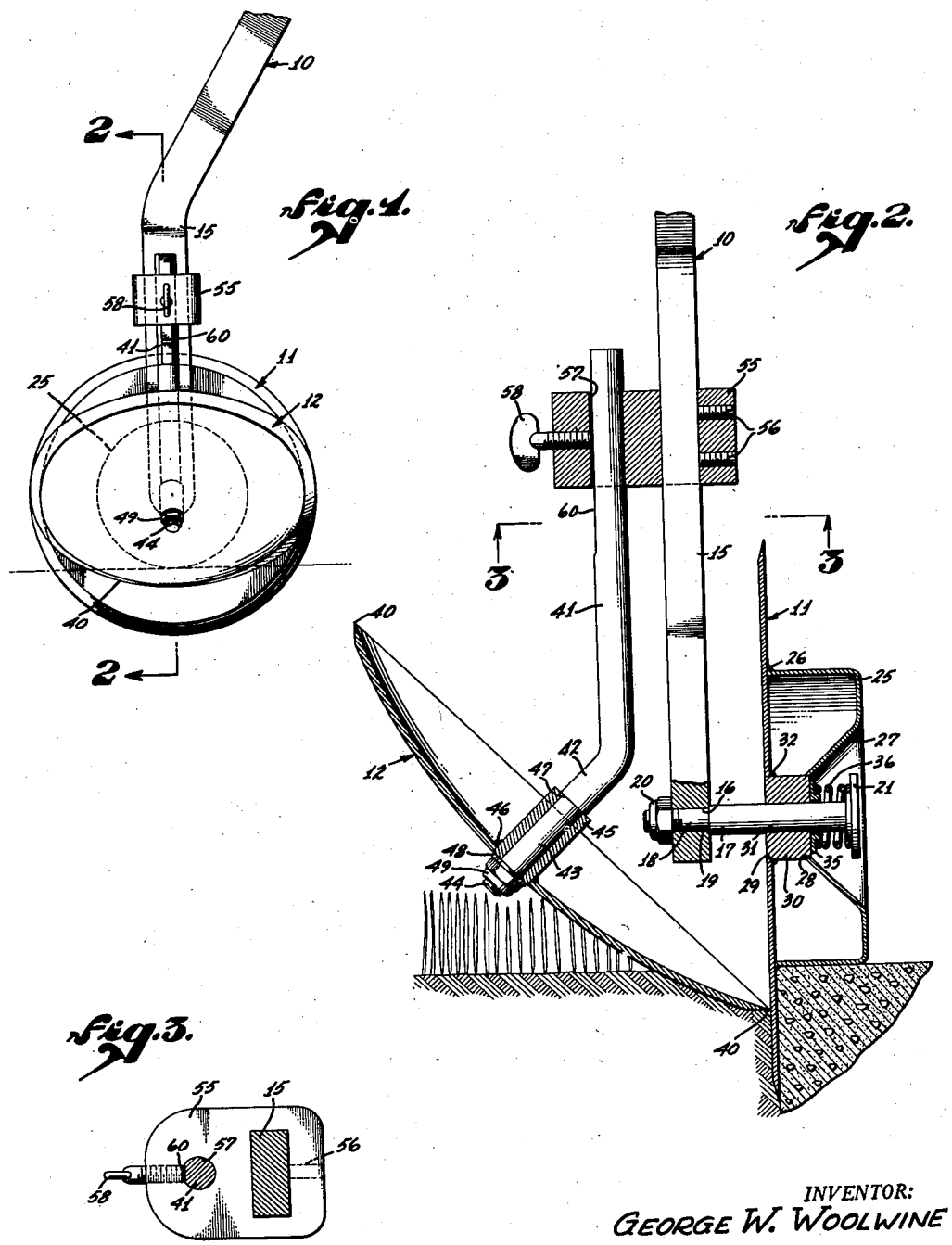
INVENTOR:
GEORGE W. WOOLWINE
BY
Huebner, Maltby & Beehler
ATTORNEYS.

Patented Apr. 14, 1953

2,634,667

UNITED STATES PATENT OFFICE 2,634,667

LAWN EDGER

George W. Woolwine, Selma, Calif.

Application November 18, 1947, Serial No. 786,558

3 Claims. (Cl. 97—227)

The present invention relates to lawn trimming tools and more particularly to a lawn edger employing a pair of circular cutting members frictionally rotated in substantially unitary relation in rolling earth traversing movement to achieve a positive cutting action therebetween.

It is well known that a great many lawn edgers employing a circular disc have been produced and are known to the prior art. It has, however, been found that none of these prior known edgers have worked satisfactorily because they usually result in pushing the grass down into a crack between the sod and the cement rather than trimming evenly and positively.

An object of my invention is to provide a lawn edger or trimmer which has a positive cutting action and does not depend on a backing of the concrete or sod in order to cut or trim the grass.

It is a further object of my invention to produce a lawn trimmer which requires relatively little manual force in order to trim the grass and edge the lawn.

Prior known lawn trimmers which depend on a positive cutting action for their trimming ability have usually taken the form of a rotating cutter adapted to roll with its cutting edge against the concrete, thereby cutting the grass and sod. It will be clear to those skilled in the art that such a device is unsatisfactory in that the cutting edge has a very short life when rolled against such obstructions as concrete. It is among the objects of my invention to produce a rotating cutter-type lawn trimmer wherein the cutting edge of a rotating cutter rides against a relatively smooth metal surface thereby increasing the length of life of the cutting edge.

It is a further object of my invention to produce a rotating cutter-type lawn edger wherein the cutting edge rotates against a backing with a substantially constant tension wherein said tension is obtained by a resilient member and not by the force of manual labor applied to the cutter.

So far as is known to me, no lawn edgers have been produced wherein the depth of cut or trim can be regulated at will. It is also among the objects of my invention to produce a lawn trimmer having adjustable means thereon so that the trimming blade can be vertically adjusted with respect to the level of the sidewalk or other obstructions along which the edger is motivated.

Other and further objects and advantages of my lawn edger will become apparent from the drawings and the specifications relative thereto.

In the drawings:

Figure 1 is a side elevation of a lawn trimmer embodying the principles of my invention.

Figure 2 is a fragmentary sectional view taken on line 2—2 of Figure 1.

Figure 3 is a sectional view taken on line 3—3 of Figure 2.

In the drawings, I have illustrated what I consider to be a preferred embodiment from the standpoint of both operation and manufacture. It is to be understood that a great many modifications, which will become apparent from a more detailed description, can be made within the scope of my invention. It is further to be understood that the embodiment herein illustrated and described is by way of illustration and not limitation.

My invention comprises essentially a handle 10 having a vertically rotating cutter disc 11 and an obliquely rotating cutter blade 12 adapted to rotate against a side of the vertically rotating disc 11, thereby providing a positive cutting action.

The handle 10 is provided with a shank 15 on the lower end thereof, which is illustrated herein as a rectangular bar. It will be, of course, understood that any desired shape, such as a rod or hollow tube, can be employed, the purpose merely being to provide a means for connecting the rotating cutters to the handle. The shank 15 is formed with a transverse bore 16 through which an axle 17 is disposed.

The axle 17 has a reduced end portion 18 which defines a shoulder 19. The outer end of the reduced end portion 18 is threaded and adapted to receive a nut 20. The purpose of such structure is readily apparent in that the nut binds against the shank 15 and holds the axle 17 rigidly in position. The outer end of the axle 17 is formed with an enlarged head 21, the purpose of which will be apparent from a further description of the function and structure.

The vertical disc 11 is circular in form and is provided with a friction-drive hub 25 which is concentric with the disc 11, axially extended from a side thereof and secured thereto by any suitable means, such as welding as at 26. The friction hub 25 is formed with a centrally concaved portion 27 and a centrally located aperture 28. The disc 11 is also formed with a centrally located aperture 29 which is concentric with the aperture 28. Aperture 29 is herein illustrated as of equal diameter to the aperture 28, but such equality is not essential, the purpose of these apertures being to receive a bearing member 30 having a longitudinal bore 31 rotatably and slidably mounted on the axle 17. The bearing member 30 is securely fastened to the disc 11 by any suitable means, such as welding, as at 32.

It will be readily understood that the purpose of the concave section 27 is to provide a recess so the head 21 will be flush with the hub 25. This is, however, a matter of choice and should not be considered a limitation on my invention.

A washer 35 is disposed over the shaft 17 and is adapted to act as a bearing surface between the bearing member 30 and a compression spring 36. The compression spring 36 is disposed in compression between the head 21 and the bearing washer 35. The purpose of the compression spring 36 will become readily apparent.

The rotating cutter blade 12 is preferably formed in a concavo-convex shape and has a peripheral cutting edge 40 adapted to ride against the surface of the vertical disc 11. The concavo-convex blade 12 is rotatably mounted on a shaft 41 and has its axis of rotation in substantially a common plane with the axis of rotation of the vertical disc 11 but intersecting said axis obliquely.

The shaft 41 is formed with an offset leg 42 having a reduced end portion 43 and threaded end 44. A bearing member 45 is disposed in the center of the blade 12 and secured thereto by any suitable means, such as a press fit or welding 46. The bearing member 45 is adapted to ride in a thrust relationship against a shoulder 47 defined by the offset leg 42 and the reduced end section 43. A washer 48 is disposed over the end 44 of the shaft and securely held in position by a lock nut 49. If desired, a thrust bearing may be interposed between the bearing member 45 and the shoulder 47.

A socket member 55 is securely mounted on the shank 15 by means of set screws 56, and formed with a bore 57 parallel with the shank 15. The shaft 41 is disposed through the bore 57 and is adjustably held in position by means of a thumb screw 58. The shaft 41 can assume a great variety of shapes. It is herein illustrated as a round rod having a flat side 60 (see Figure 3). The purpose of the flat side is to prevent rotation of the shaft 41. It would be apparent that square bars could be used with equal efficiency. However, it is believed that a round rod having a flat side is the preferred form because from a manufacturing standpoint, it is easier to drill the bore 57 round than it is to broach a square hole through the block 55.

The purpose of the spring 36 is to provide a constant tensional engagement between the vertical cutting disc 11 and the peripheral cutting edge of the concavo-convex blade 12. It is readily apparent that this same function can be obtained by other means such as, for example, by placing the spring 36 between the washer 48 and the blade 12, which would urge the blade 12 inwardly against the disc 11; or as another example, by placing a coil spring in tension between the shaft 41 and the block 55 which would also urge the blade 12 against the disc 11 because of a rotational force acting on the shaft 41.

I have herein illustrated the blade 12 as a concavo-convex disc. Such form is preferred because it is more desirable to have the cutting edge 40 ride at right angles to the surface of the disc 11, which can be accomplished with a greater cutting angle on the cutting edge 40 when the disc is substantially concavo-convex.

It is desirable to be able to adjust the vertical position of the cutting blade 12 with respect to the cutting disc 11 so that any desired depth of cut in the trimming operation may be made. In order to achieve this purpose, I have herein shown a means for adjusting the position of the rod 41 vertically within the block 55. It will, of course, be apparent that the same function can be obtained by making the block 55 adjustable with respect to the shank 15 or by substituting in place of the shaft 41 a telescoping mount adapted to support the oblique section 42.

It will readily be understood that the important features of my invention reside in a lawn edger having a vertical cutting disc resiliently engaging in cutting relationship an oblique cutting blade whose point of engagement therewith is radially adjustable relative to the disc. Further it will be readily apparent that the disc 11 and the drive hub 25 may be rotated in unitary relation by any suitable driving means such as a small gasoline engine, or the like, in driving connection therewith. Powered driving of the cutter blade and drive hub has been found particularly advantageous in trimming the edges of plots of grass adjacent side walks, curbings, headstone markers in cemeteries, and other bounding means, where the grass is found to be particularly tenacious in character and/or the earth firmly compacted adjacent said bounding means.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. A lawn edger comprising a handle having a lower end portion, an axle mounted transversely on the lower end portion of the handle, a circular disc having substantially flat sides rotatably mounted concentrically on the axle in substantially parallel relation to the handle and for axial slidable movement toward and from the handle, a cylindrical hub integral with the disc and concentrically and axially extended from a side thereof away from the handle, a shaft mounted on the handle in substantially parallel relation to the handle and opposite to the handle from the disc and for adjustable positioning longitudinally of the handle, said shaft having an angled end portion directed outwardly from the handle and away from the disc, a circular concavo-convex blade having a peripheral cutting edge rotatably mounted concentrically on said end portion of the shaft with its concave side toward the disc and its cutting edge in engagement with a side of the flat disc at a position spaced radially inwardly from the periphery of the disc, and resilient means mounted on the axle urging the flat disc axially against the cutting edge of the concavo-convex blade.

2. A lawn edger comprising an elongated handle, an axle mounted transversely on the handle, a substantially flat circular disc rotatably mounted concentrically on the axle, said axle having an enlarged head in spaced relation to the handle whereby axial movement of the disc on the axle is accommodated between the handle and the head, a shaft mounted on the handle having a journal portion adjacent to the axle and in coplanar relation therewith, said journal portion being extended outwardly from the handle and away from the disc in a plane common to the axle, a concavo-convex blade having a peripheral cutting edge rotatably mounted concentrically on the journal portion of the shaft with the concave side of the blade disposed toward the disc and the peripheral cutting edge of the blade in rolling engagement with a flat side of the disc at a position spaced radially inwardly from the periphery of the disc, and a compression spring mounted between the disc and the head of the axle whereby the disc is urged axially into engagement with the cutting edge of the blade.

3. A lawn edger comprising an elongated handle, an axle mounted transversely on the handle having an enlarged head in spaced relation to the handle, a substantially flat circular disc rotatably mounted concentrically on the axle between the handle and the head of the axle, a block mounted on the handle having a bore formed therein in substantially parallel relation to the handle, a shaft having a longitudinal flat mounted in the bore of the block for adjustable positioning longitudinally thereof, screw-threaded means mounted in the block engageable with the flat of the shaft to lock the shaft in longitudinally adjustable position in the bore and to preclude rotation of the shaft in the bore, said shaft having an angularly related journal portion adjacent to the axle extended outwardly from the handle and away from the disc in a plane common to the axle, a concavo-convex blade having a peripheral cutting edge rotatably mounted concentrically on the journal portion of the shaft with the concave side of the blade disposed toward the disc, and with the peripheral cutting edge in rolling engagement with the adjacent side of the disc at a point spaced radially inwardly from the periphery of the disc, a stop mounted on the extended end of the journal portion of the shaft limiting axial movement of the blade on said journal portion away from the disc, and a compression spring mounted between the head of the axle and the disc urging the disc into continuous engagement with the cutting edge of the blade.

GEORGE W. WOOLWINE.

References Cited in the file of this patent

UNITED STATES PATENTS

| Number | Name | Date |
|---|---|---|
| 331,804 | Mason | Dec. 8, 1885 |
| 1,127,764 | Huck | Feb. 9, 1915 |
| 1,916,725 | Harbour et al. | July 4, 1933 |
| 1,970,827 | Van Kesteren | Aug. 21, 1934 |
| 2,212,057 | Waller | Aug. 20, 1940 |